United States Patent
Hagedoorn

(10) Patent No.: US 8,640,935 B2
(45) Date of Patent: Feb. 4, 2014

(54) MOUNTING ASSEMBLY FOR CHILD'S BICYCLE SEAT

(75) Inventor: Wilhelm Jasper Hagedoorn, Velp (NL)

(73) Assignee: Dremefa Beheer B.V., Doesburg (NL)

( * ) Notice: Subject to any disclaimer, the term of this patent is extended or adjusted under 35 U.S.C. 154(b) by 139 days.

(21) Appl. No.: 13/096,325

(22) Filed: Apr. 28, 2011

(65) Prior Publication Data

US 2011/0266320 A1 Nov. 3, 2011

(30) Foreign Application Priority Data

May 3, 2010 (EP) .................................... 10161757

(51) Int. Cl.
- *B62J 7/00* (2006.01)
- *B62J 7/06* (2006.01)
- *B62J 9/00* (2006.01)
- *B62J 11/00* (2006.01)

(52) U.S. Cl.
USPC ........... 224/415; 224/419; 224/420; 224/448; 224/459; 224/461

(58) Field of Classification Search
USPC ................. 224/415, 448, 456, 461, 419, 420; 297/195.12
See application file for complete search history.

(56) References Cited

U.S. PATENT DOCUMENTS

| | | | | |
|---|---|---|---|---|
| 441,485 A * | 11/1890 | Greenwood | ................ | 280/202 |
| 453,212 A * | 6/1891 | Sager | ................ | 297/129 |
| 477,042 A * | 6/1892 | Calver | ................ | 224/415 |
| 530,160 A * | 12/1894 | Coulson | ................ | 248/214 |
| 551,068 A * | 12/1895 | Wilson | ................ | 280/202 |
| 556,951 A * | 3/1896 | Williams | ................ | 280/202 |
| 615,106 A * | 11/1898 | Batterthwaite | ................ | 224/415 |
| 622,500 A * | 4/1899 | Kuster | ................ | 280/202 |
| 903,290 A * | 11/1908 | Jahnel et al. | ................ | 224/444 |
| 2,321,752 A * | 6/1943 | Kerr | ................ | 280/202 |
| 2,436,991 A * | 3/1948 | Dirksen | ................ | 224/415 |
| 3,544,158 A * | 12/1970 | Timms | ................ | 297/254 |
| 3,743,321 A * | 7/1973 | Luschen et al. | ................ | 280/202 |

(Continued)

FOREIGN PATENT DOCUMENTS

| | | | |
|---|---|---|---|
| BR | 7302328 U | 5/1994 | |
| CA | 2428328 A1 * | 11/2004 | ............... B62J 21/12 |

(Continued)

OTHER PUBLICATIONS

European Search Report for EP 10161757.

*Primary Examiner* — Nathan J Newhouse
*Assistant Examiner* — Lester L Vanterpool
(74) *Attorney, Agent, or Firm* — Hoffmann & Baron, LLP

(57) ABSTRACT

A bicycle includes a frame with at the front end a head tube, a fork having at its upper end a steering tube extending upwardly through the head tube, and a stem attached to the handlebars. The stem has a clamp portion clamped around the steering tube. One or more spacer rings or bushings are arranged around the steering tube between the upper end of the head tube and the stem clamp portion. A mounting assembly for mounting a child seat on the bicycle is mounted around the steering tube. The mounting assembly includes a support body and a clamping element to attach the support body to the steering tube. The clamping element is coupled to the support body and is clamped around the steering tube and arranged between two of said spacer rings or between the head tube and a spacer ring.

7 Claims, 6 Drawing Sheets

(56) References Cited

U.S. PATENT DOCUMENTS 3,902,737 A * 9/1975 Berger et al. ............... 280/202
5,800,014 A * 9/1998 Musso, Jr. .................. 297/243
6,685,265 B1 * 2/2004 Moore, Jr. ............... 297/195.13
7,044,541 B1 * 5/2006 Eissinger et al. ........ 297/195.12

FOREIGN PATENT DOCUMENTS

| DE | 100 35 429 A1 | 5/2002 |
| EP | 1 099 619 A2 | 5/2001 |
| WO | 03/051708 A1 | 6/2003 |
| WO | 2007/111497 A1 | 10/2007 |

* cited by examiner

MOUNTING ASSEMBLY FOR CHILD'S BICYCLE SEAT

CROSS-REFERENCE TO RELATED APPLICATIONS

This application claims the benefit of European Application No. 10161757.9, filed May 3, 2010, the contents of which is incorporated by reference herein.

FIELD OF THE INVENTION

The present invention relates to mounting a child seat to a bicycle.

BACKGROUND OF THE INVENTION

In recent years all kinds of leisure bicycles have gained more and more popularity. Leisure bicycles like ATB's have a so called "threadless stem" or "A-head" which stem is clamped on the steering tube. Commonly it is difficult or impossible to mount a child seat to the steering structure of an ATB or similar leisure bicycle with the available known mounting assemblies.

In WO 2007/111497A1 is shown a mounting assembly in particular usable on ATB's, which mounting assembly is mounted to the front end of the bicycle frame. With this known mounting assembly the child seat will not turn with the movement of the handlebar. Although the mounting assembly of WO 2007111497 functions satisfactory it is often desired that the child seat turns with the steering handlebar.

SUMMARY OF THE INVENTION

In FIG. 1 is shown a child seat 101 manufactured by the applicant. The seat 101 has as assembly member and two assembly pins 102 on the front extending from the seat 101 downwardly. In FIG. 2 is shown a known mounting assembly to attach the seat 101 to the bicycle. The bicycle shown in FIG. 2 is, contrary to the type with a threadless stem, of the type with a so called threaded headset in which the steering stem 104 is inserted in the steering tube and clamped thereto. The length of the steering stem 104 is commonly of sufficient length that a mounting clamp 103 can be attached to the steering stem 104 of the bicycle as is shown in FIG. 2. The mounting clamp 103 has two cylindrical sockets 105 in which the pins 102 of the seat 101 can be inserted. With this known mounting assembly the child seat 101 is turning with the steering stem 104 and thus with the steering handlebar. This known mounting clamp 103 is often not suitable for mounting on a leisure bicycle like an ATB.

The invention has for an object to provide a bicycle with an alternative mounting of a mounting assembly.

This object is achieved by a bicycle comprising a frame with at the front end a head tube, a fork having at its upper end a steering tube extending upwardly through the head tube, and a stem attached to the handlebars, which stem has a clamp portion clamped around the steering tube, wherein one or more spacer rings or bushings are arranged around the steering tube between the upper end of the head tube and the stem clamp portion, characterised in that a mounting assembly for mounting a child seat on the bicycle is mounted around the steering tube, said mounting assembly comprising a support body and a clamping element to attach the support body to the steering tube, wherein the clamping element is coupled to the support body and is clamped around the steering tube and arranged between two of said spacer rings or between the head tube and a spacer ring.

In a preferred embodiment the support body comprises a bracket made of a metal plate, which bracket is substantially U-shaped and is arranged around the clamping element.

Preferably, the bracket has upper and lower flanges in which on either side of the steering tube a through hole is provided, each through hole in the upper flange having a corresponding through hole in the lower flange aligned therewith, said corresponding through holes forming a receiving socket each for receiving an assembly member fixedly attached to the child seat and protruding therefrom, which sockets, in a mounted state, extend substantially parallel with the steering tube.

In a further embodiment the clamping element comprises a first clamping ring portion that is located in the bend of the U-shape and has a cylindrically curved inner wall which engages the steering tube, and a second clamping ring portion which has side edges which are coupled to the legs of the U-shape and has a cylindrically curved inner wall which engages the inner tube opposite the first portion.

In yet a further embodiment the second clamping ring portion of the clamping element is slideable along the legs of the U-shape, wherein tensioning means, preferably a pair of bolts and nuts, are provided which tension said clamping ring portions towards each other and into tight engagement with the steering tube.

The invention furthermore relates to a method for mounting a mounting assembly for a child seat on a bicycle, comprising a frame with at the front end a head tube, a fork having at its upper end a steering tube extending upwardly through the head tube, and a stem attached to the handlebars, which stem has a clamp portion clamped around the steering tube, one or more spacer rings or bushings being arranged around the steering tube between the upper end of the head tube and the stem clamp portion, said mounting assembly comprising a support body and a clamping element to attach the support body to the steering tube, wherein the clamping element is coupled to the support body, the method characterised by the following steps:
- releasing the clamp portion of the stem and removing the stem with the handlebars from the steering tube;
- removing one or more spacer rings from the steering tube;
- if necessary, replacing at least one spacer ring;
- placing the clamping element with the support body around the steering tube on top of the at least one spacer ring or on top of the head tube;
- placing one or more spacer rings around the steering tube on top of the clamping element; and
- replacing the stem and attaching the clamping portion thereof to the steering tube.

Unlike the mounting structures known from WO 2007/111497 and FIG. 2, the mounting structure according to the invention is integrated in the bicycle structure. The user has to dismount the stem from the steering tube to arrange the clamp portion around the steering tube and then replace the stem and possibly some of the spacer rings.

BRIEF DESCRIPTION OF THE DRAWINGS

The invention will be described in more detail with reference to the drawings, in which.

DETAILED DESCRIPTION OF THE INVENTION

Figure 3:
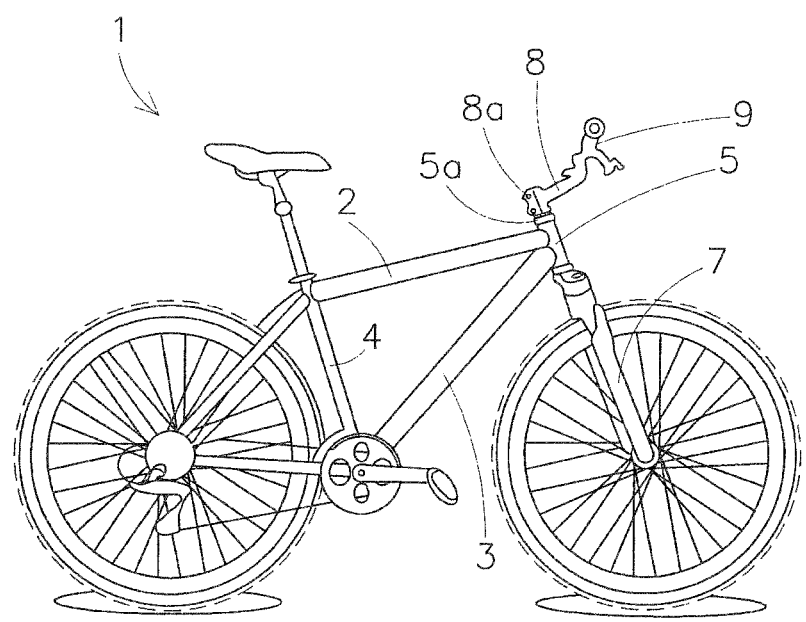
FIG. 3 shows an All Terrain Bike (ATB)

In FIG. 3 is shown an all terrain bike (ATB) 1. The shown bicycle 1 has a frame comprising a top tube 2, a down tube 3 and a seat tube 4. At the front end the frame has a head tube 5. At the upper end of the head tube an annular bearing 5a is arranged. Through the head tube 5 extends a steering tube 6, which at its lower end is connected to a fork 7 for the front wheel. At the upper end of the steering tube 6 is attached a stem 8. The stem 8 is clamped with a clamp portion 8a thereof to the steering tube 6. At the front end of the stem 8, the handlebar 9 is attached. Although this is not shown in FIG. 3, spacer rings are commonly arranged between the upper end of the head tube 5 and the clamp portion 8a. On top of the stem an axial bolt is arranged which extends in the axial direction of the steering tube 6 and extends through a (threaded) bore 6a in the steering tube 6. This axial bolt (not shown) with its bolt head retains the stem in its axial position and presses the clamp portion 8a of the stem 8 from above into tight engagement with the spacer ring 41 directly below it. Tightening of the axial bolt removes the clearance space which might be present between the spacer rings 40, 41 and the clamping portions 31, 32, which will be described below.

Figure 4:
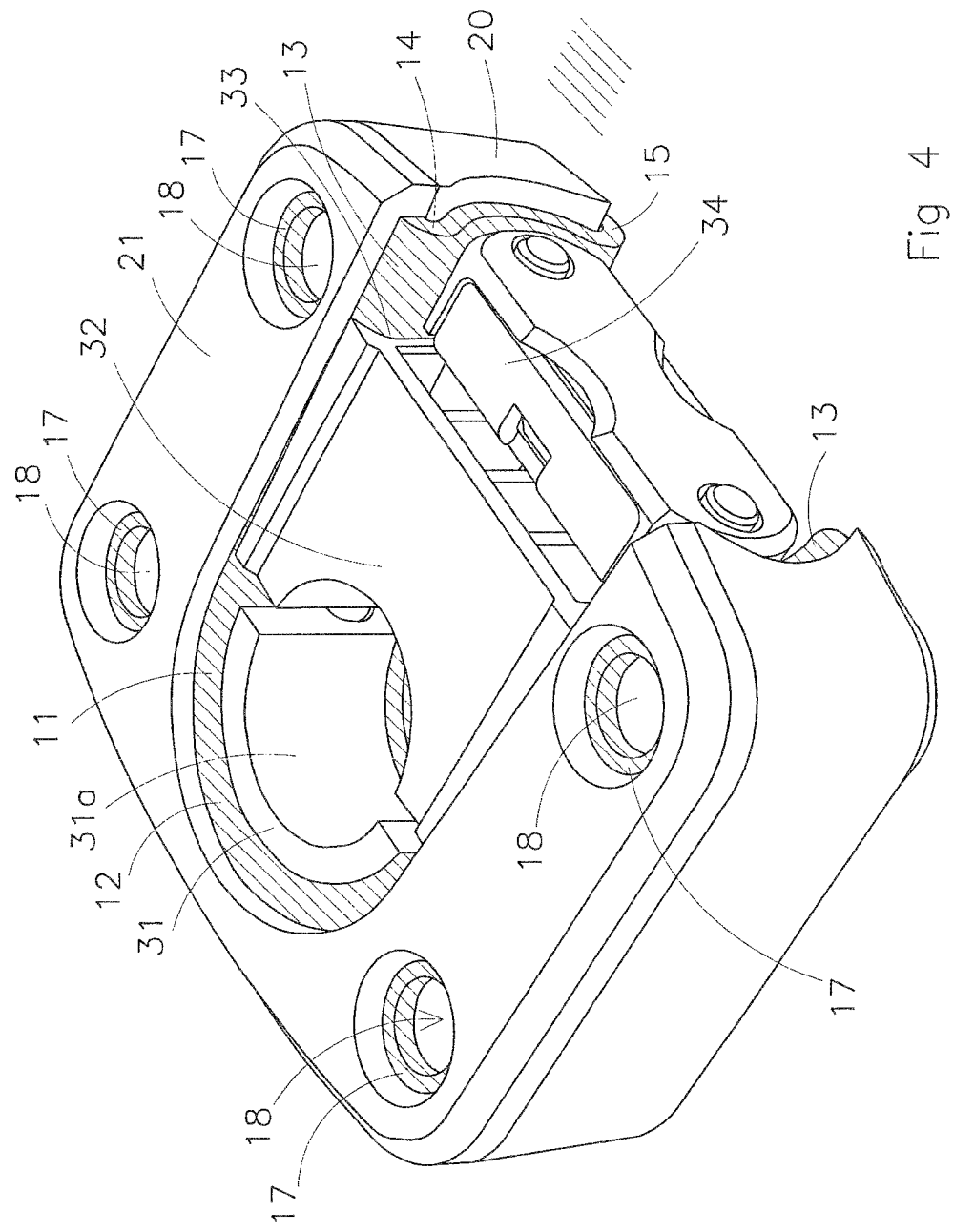
FIG. 4 shows in a view in perspective from above a mounting assembly according to the invention.
Figure 5:
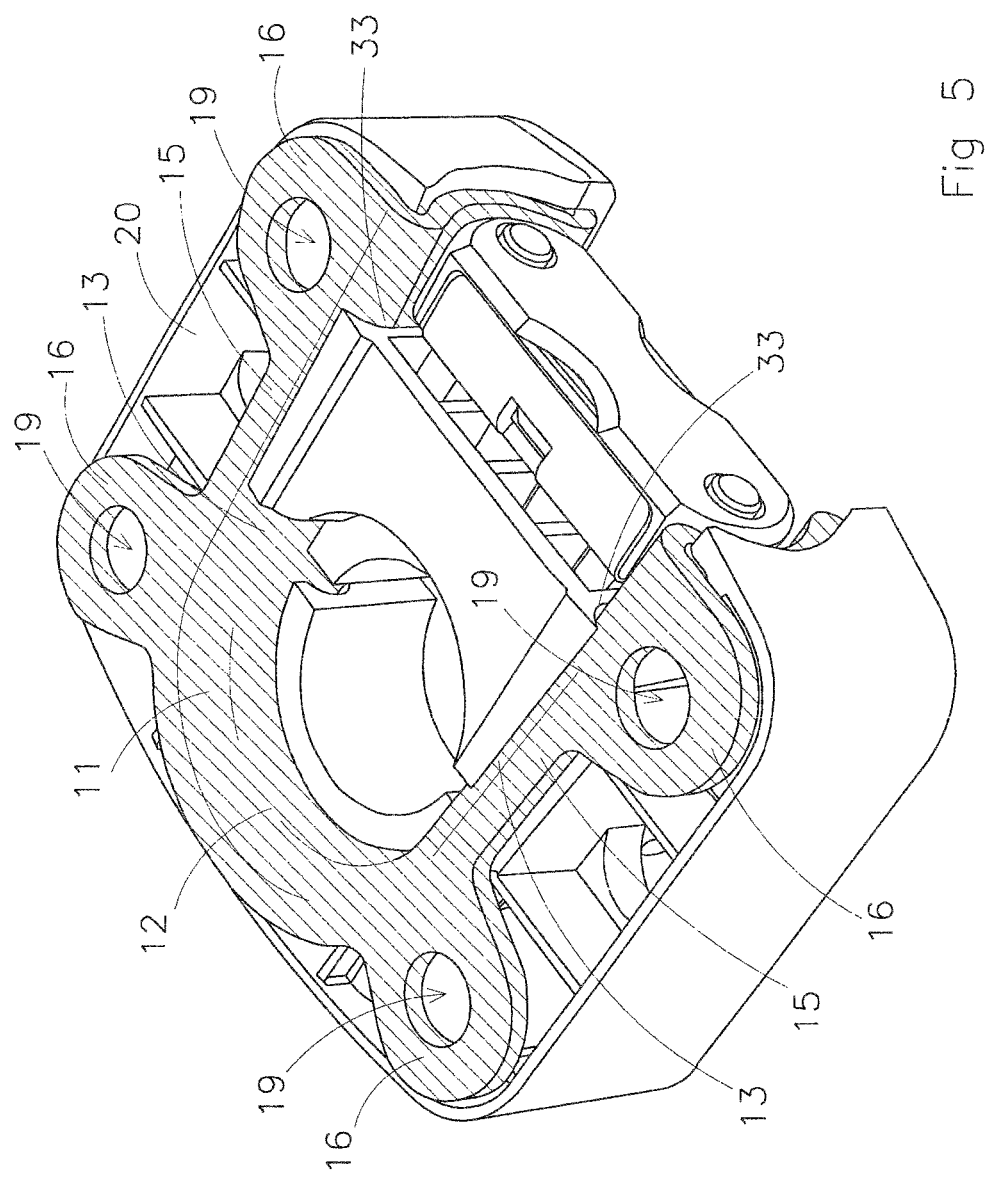
FIG. 5 shows in a view in perspective from below the mounting assembly of FIG. 4.
Figure 6:
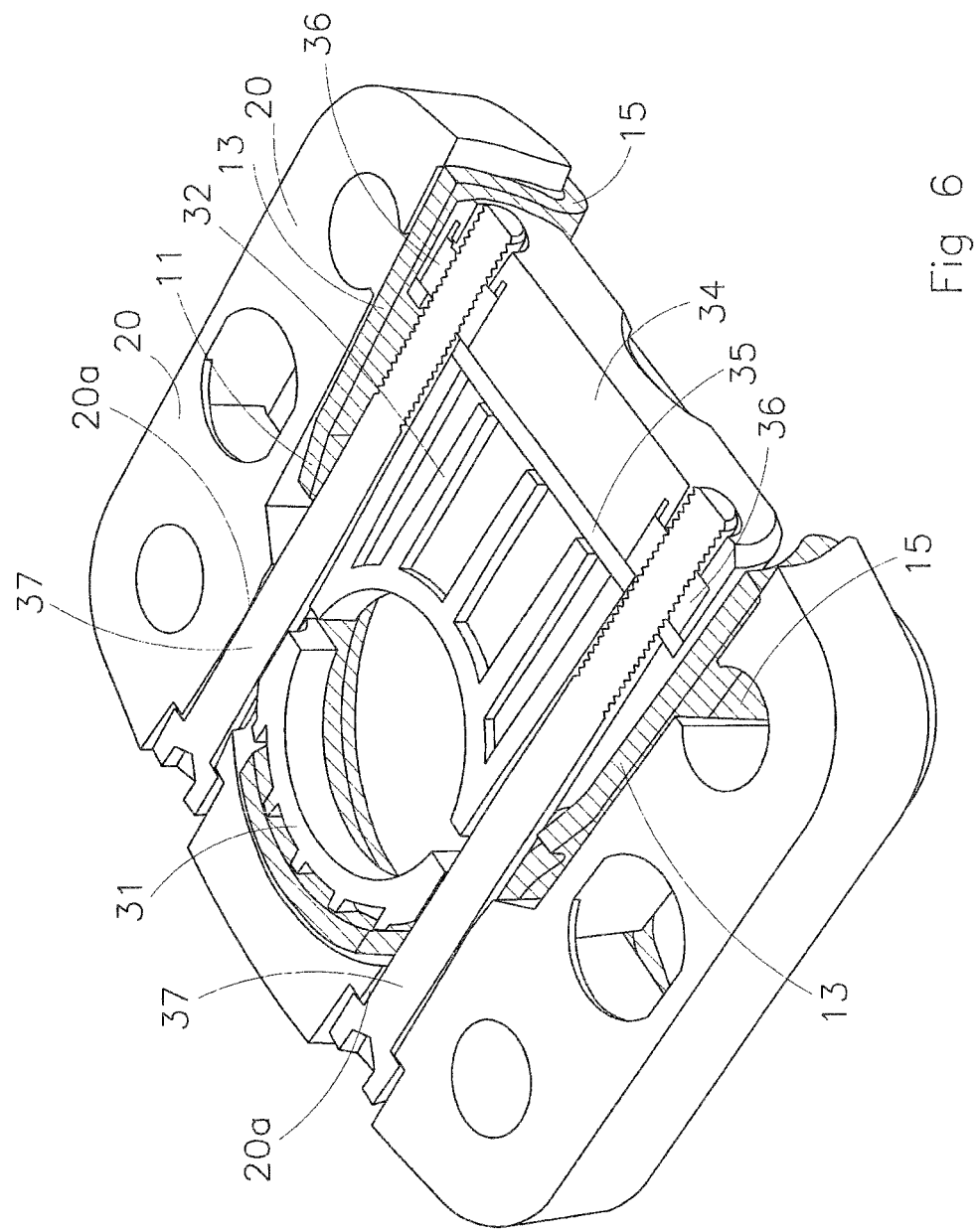
FIG. 6 shows in perspective a sectioned mounting assembly of FIG. 4.

In FIGS. 4-6 is shown a mounting assembly 10, which can be mounted on the steering tube 6 of the bicycle 1. The mounting assembly 10 comprises a metal bracket 11. The bracket 11 is generally U-shaped having a bend 12 and two generally parallel legs 13, which extend from the bend 12.

Figure 1:
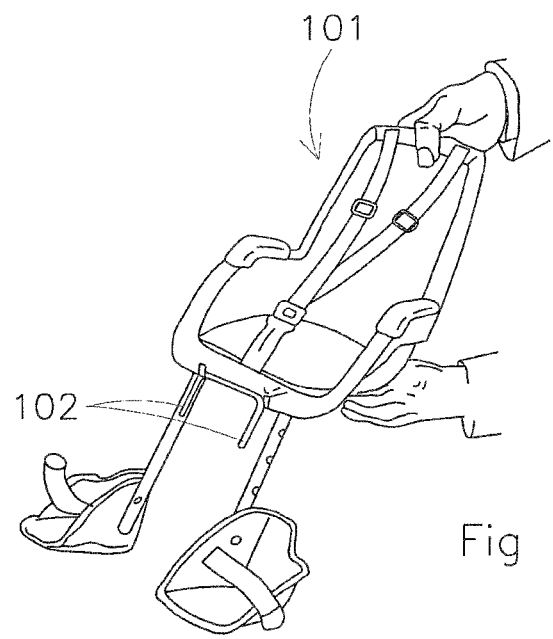
FIG. 1 shows a child seat which can be mounted to a bicycle with a mounting assembly according to the invention.
Figure 2:
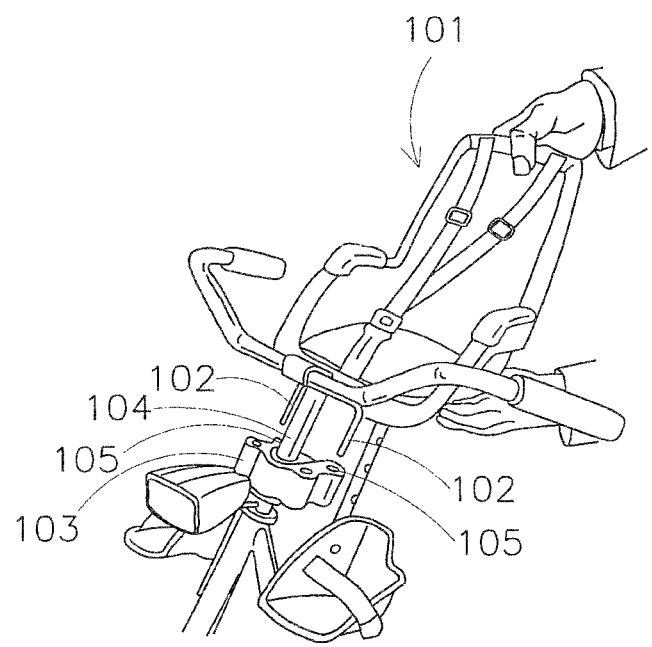
FIG. 2 shows the child seat of FIG. 1 mounted on a bicycle by means of a mounting assembly known from the prior art.

The bracket 11 furthermore comprises an upper flange 14 and a lower flange 15, which extend outwardly from the upper and lower edges of the legs 13. The upper and lower flanges 14, 15 are substantially parallel to each other and each have four ears 16, 17. In FIG. 5 the ears 16, 17 of the lower flange 15 are clearly visible. The ears 16, 17 each have a through hole 18, 19 in them. The through holes of two corresponding ears 16, 17 are aligned such that they constitute a socket for an assembly pin 102 of a child seat 101 as is shown in FIG. 1.

The bracket 11 in the preferred embodiment thus constitutes a rear pair of sockets for the assembly pins 102 of the child seat 101 as well as a front pair of sockets which is for insertion of assembly pins coupled to a windscreen (not shown), a map-holder (not shown) or a luggage carrier (not shown).

The mounting assembly 10 also comprises a support body 20, which is made of plastic. The support body 20 is located on the outer side of the legs 13 and the bend 12 of the U-shaped bracket 11. The lower flanges of the bracket 11 engage the lower side of the support body 20 as can be seen in FIG. 5. The upper flanges of the bracket 11 engage the upper side of the support body 20 and are covered by a covering lid 21. The covering lid is connected to the support body 20, e.g. by a snap connection. The lid 21 has holes in it located in correspondence with the location of the holes in the ears 16, 17 of the bracket 11, such that an assembly pin 102 can pass through it.

The mounting assembly 10 furthermore comprises a clamping element. The clamping element comprises a first clamping ring portion 31 that is located on the inner side of the bend 12 of the U-shape. The first clamping ring portion 31 has a cylindrically curved inner wall 31a which in use engages the steering tube 6. The clamping element furthermore comprises a second clamping ring portion 32. The second clamping ring portion 32 has at its front end a cylindrically curved inner wall 32a which in use engages the steering tube 6 opposite the first portion 31. The second clamping ring portion 32 is shaped as a block with side edges 32b. On each side edge a guiding channel 33 is arranged, which engages the inner side of the legs 13 and engages over the upper and lower edge of the legs 13, such that the block 32 is fixed in the axial direction of the clamping ring. The guiding channels 33 allow a sliding movement of the block 32 in the longitudinal direction of the legs 13.

At the rear end of the second clamping ring portion 32 a clamping block 34 is arranged. The clamping block 34 is made of plastic and has a metal tensioning plate 35 arranged on the side facing the second clamping ring portion 32. In the plastic clamping block two recesses are provided in which and screw nuts 36 are received and fixed, as can be best seen in the sectional view of FIG. 6. The mounting assembly 10 furthermore comprises two clamping bolts 37 which extend through bores 20a in the support body 20 and are screwed with their threaded end portions in the screw nuts 36.

Instead of a clamping block 34, it is also possible to arrange the screw nuts 36 in the clamping ring portion 32. Also other tensioning structures are conceivable.

The mounting assembly 10 is mounted to a bicycle as follows (see FIGS. 7 and 8):

The stem 8 with its clamp portion 8a that is clamped around the steering tube 6 is released. The stem 8 with the handlebars 9 is removed from the steering tube 6. One or more spacer rings or bushings which are arranged around the steering tube 6 between the bearing 5a at the upper end of the head tube 5 and the stem clamp portion 8a, are removed. Then at least one lower spacer ring 40 is replaced such that it rests on the upper end of the head tube 5 (see FIG. 8). The bolts 37 of the mounting assembly 10 are brought in a loosened state such that the second clamping ring portion 32 can be slided rearwardly such that the mounting assembly 10 can placed from above on the steering tube 6 and slided downwards until the clamping ring portions 31 and 32 rest on the spacer ring 40. Then the clamping ring portions 31 and 32 are tensioned against the steering tube 6 by tensioning the bolts 37, thereby fixing the assembly 10 to the steering tube 6. A further spacer ring 41 is arranged around the steering tube 6 on top of the clamping ring portions 31, 32. Finally, the stem 8 is replaced with its stem clamp portion 8a on top of the spacer ring 41. The clamp portion 8a is then fixed to the steering tube 6.

The mounting assembly is now ready for use and a child seat 101 can be placed with the assembly pins 102 in the sockets 18, 19 in the mounting assembly 10. The seat 101 in the mounted state will turn with the steering tube 6 of the bicycle.

Figure 7:
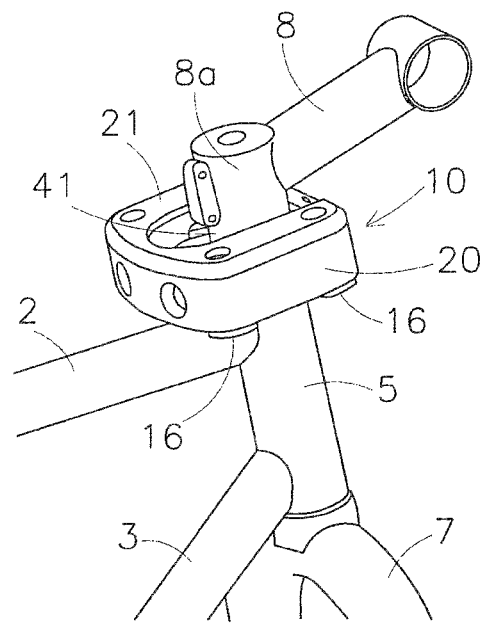
FIG. 7 shows the front portion of the frame of the bicycle of FIG. 3 with the mounting assembly of FIG. 4 mounted thereto.
Figure 8:
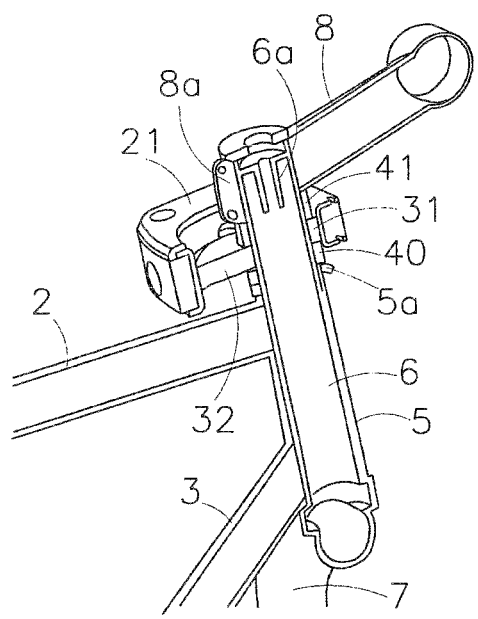
FIG. 8 shows a sectional view of the portion of FIG. 7 with the mounting assembly.

It should be noted that the mounting assembly can be mounted also in the other way around as is shown in FIGS. 7 and 8: The bolt heads would in that case face the front of the bicycle and the clamping block 34 would face rearwardly.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

The invention claimed is:

1. A bicycle comprising:
   a frame with at the front end a head tube;
   a fork having at its upper end a steering tube extending upwardly through the head tube; and
   a threadless stem attached to the handlebars, which threadless stem has a clamp portion clamped around the steering tube;
   wherein one or more spacer rings or bushings are arranged around the steering tube between the upper end of the head tube and the stem clamp portion;
   wherein a mounting assembly to mount a child seat on the bicycle is mounted around the steering tube, said mounting assembly comprising a support body having opposed and general planar upper and lower surfaces and a central through aperture to engage the steering tube and a clamping element disposed therein to attach the support body to the steering tube;
   wherein the support body comprises a receiving socket to receive an assembly member of the child seat which assembly member is fixedly attached to the child seat and protruding therefrom; and
   wherein the clamping element is clamped around the steering tube and arranged between two of said spacer rings or between the head tube and a spacer ring.

2. The bicycle according to claim 1, wherein the support body comprises a bracket made of a metal plate, which bracket is substantially U-shaped and is arranged around the clamping element.

3. The bicycle according to claim 2, wherein the bracket has upper and lower flanges in which on either side of the steering tube a through hole is provided, each through hole in the upper flange having a corresponding through hole in the lower flange aligned therewith, said corresponding through holes forming said receiving sockets, which sockets, in a mounted state, extend substantially parallel with the steering tube.

4. The bicycle according to claim 1, wherein the clamping element comprises a first clamping ring portion that is located in the bend of the U-shape and has a cylindrically curved inner wall which engages the steering tube, and a second clamping ring portion which has side edges which are coupled to the legs of the U-shape and has a cylindrically curved inner wall which engages the inner tube opposite the first portion.

5. The bicycle according to claim 4, wherein the second clamping ring portion of the clamping element is slideable along the legs of the U-shape, wherein tensioning means are provided which tension said clamping ring portions towards each other and into tight engagement with the steering tube.

6. The bicycle according to claim 5, wherein the tensioning means comprise a pair of bolts and nuts.

7. A method for mounting a mounting assembly for a child seat on a bicycle, comprising: a frame with at the front end a head tube, a fork having at its upper end a steering tube extending upwardly through the head tube, and a threadless stem attached to the handlebars, which threadless stem has a clamp portion clamped around the steering tube, one or more spacer rings or bushings being arranged around the steering tube between the upper end of the head tube and the stem clamp portion, said mounting assembly comprising a support body having opposed and general planar upper and lower surfaces and a central through aperture to engage the steering tube and a clamping element disposed therein to attach the support body to the steering tube,
   wherein the support body comprises a receiving socket to receive an assembly member of the child seat which assembly member is fixedly attached to the child seat and protruding therefrom, and wherein the clamping element is clamped around the steering tube, the method comprises the following steps:
   releasing the clamp portion of the threadless stem and removing the threadless stem with the handlebars from the steering tube;
   removing one or more spacer rings from the steering tube;
   if necessary, replacing at least one spacer ring;
   placing the clamping element with the support body around the steering tube on top of the at least one spacer ring or on top of the head tube;
   if possible, placing one or more spacer rings around the steering tube on top of the clamping element; and
   replacing the threadless stem and attaching the clamping portion thereof to the steering tube.

* * * * *